Sept. 27, 1938.  H. C. SWERTFEGER  2,131,337
VEHICLE STAKE
Filed Oct. 5, 1937   2 Sheets-Sheet 1

Inventor
Harold C. Swertfeger

By Clarence A. O'Brien
Hyman Berman
Attorneys

Sept. 27, 1938.  H. C. SWERTFEGER  2,131,337
VEHICLE STAKE
Filed Oct. 5, 1937    2 Sheets-Sheet 2
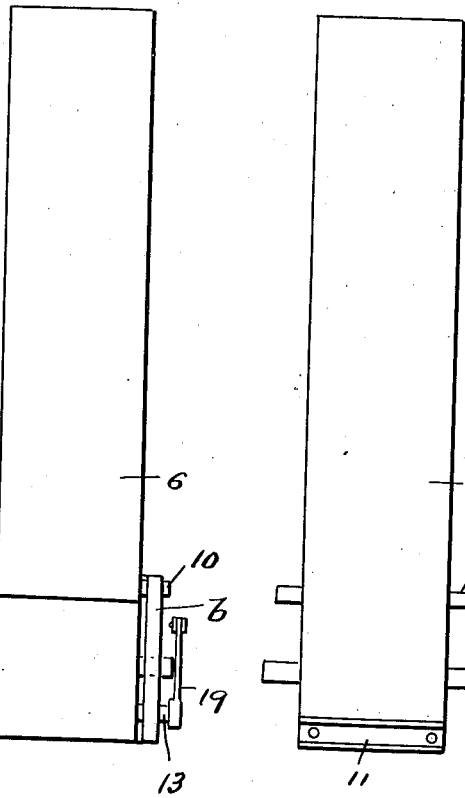
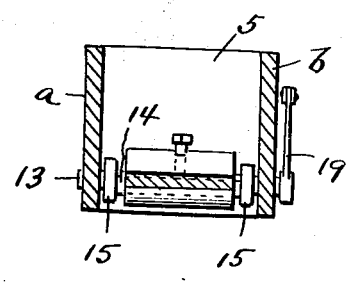
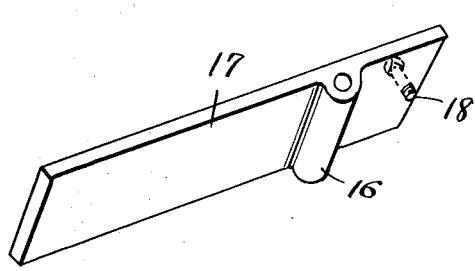
Inventor
Harold C. Swertfeger
By Clarence A. O'Brien
Hyman Berman
Attorneys Patented Sept. 27, 1938

2,131,337

UNITED STATES PATENT OFFICE 2,131,337

VEHICLE STAKE

Harold C. Swertfeger, Carson, Va.

Application October 5, 1937, Serial No. 167,448

2 Claims. (Cl. 280—145)

This invention appertains to new and useful improvements in stake structures such as are employed on trucks in the hauling of logs, barrels, etc.

The principal object of the present invention is to provide a stake structure provided with control means whereby the stake can be held in a positive manner when in use and which can be readily released when a cargo is to be discharged.

Another important object of the invention is to provide a stake and control therefor which will be of simple construction and substantially foolproof in operation.

These and other important objects and advantages of the invention will become apparent to the reader of the following specification.

In the drawings:—

Figure 2 is an end elevational view of the assembly.

Figure 3 is a side elevational view of the stake removed from the control mechanism.

Figure 5 is a perspective view of the latch member.

Figure 6 is a sectional view taken substantially on the line 6—6 of Figure 1.

Figure 7 is a perspective view of a shim.

Figure 1:
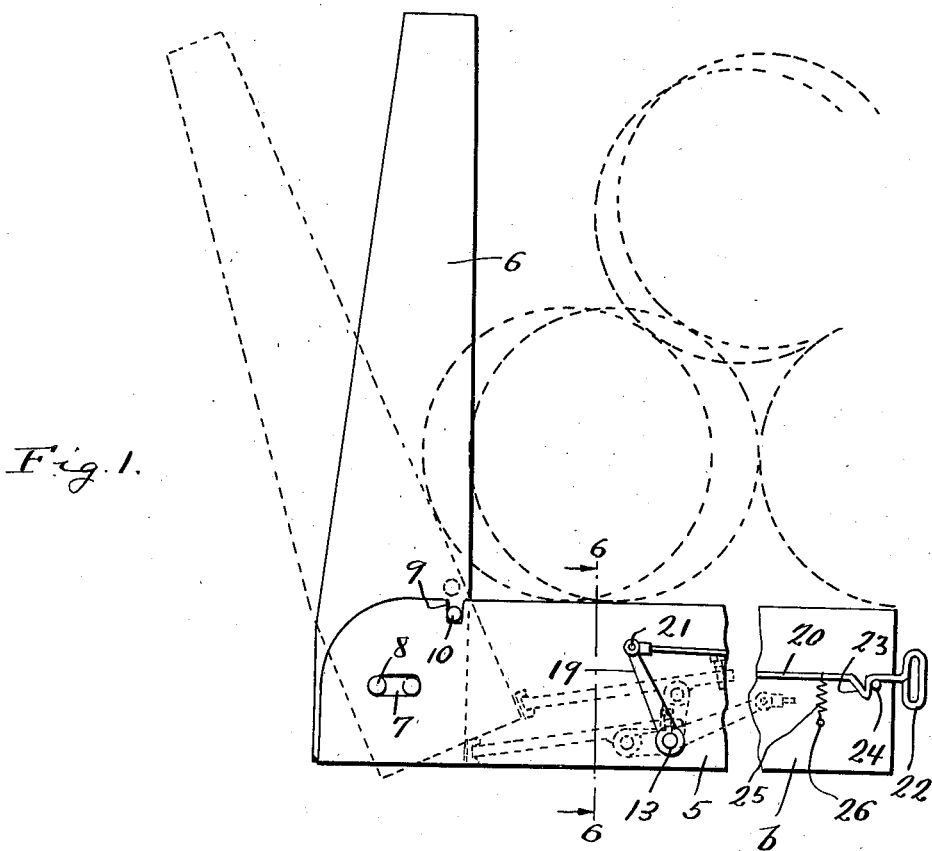
Figure 1 represents a side elevational view of one of the stake and control assemblies.
Figure 4:
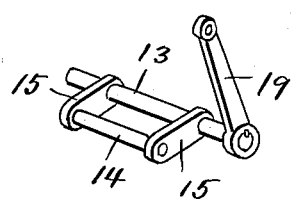
Figure 4 is a perspective view of the rockable assembly.

Referring to the drawings wherein like numerals designate like parts, it can be seen that the stake and control means can be installed at the desired intervals along the sides of a truck bed. The assembly consists of the substantially U-shaped frame 5 which includes the side walls a—b between the free ends of which is mounted the lower end of the upwardly tapering stake 6. The free end portions of the side walls a—b are provided each with a slot 7 for receiving the end portions of the cross pin 8, which pin is disposed through the lower portion of the stake 6 as is clearly shown in Figure 3.

The upper edge portions of the side walls a—b adjacent the free ends thereof are provided with notches 9 for receiving the end portions of the cross pin 10. (See Figures 1 and 3.)

The inner side of the stake 6 at the lower portion thereof has the channeled member 11 secured thereto and its proper relationship with respect to the stake 6 may be adjusted and determined by a shim or shims one of which is shown in Figure 7 and denoted by numeral 12.

Extending through the side walls a—b is the shaft 13 and adjacent this is the countershaft 14 connected rigidly with the shaft 13 by connectors 15—15. The shaft 14 extends through the barrel-like formation 16 on the bottom of the latch plate 17. This latch plate is of elongated shape, with one end engageable into the channeled member 11 of the stake 6 to hold the stake in elevated position while the other end is provided with a downwardly feedable set screw 18. The set screw 18 is adjustable against the shaft 13 to regulate the pitch of the latch plate 17.

One end of the shaft 13 is provided with the arm 19 to which one end of the control rod 20 is pivotally connected as at 21. The other end of the rod 20 is provided with the hand loop 22 and adjacent this loop is the offset 23 defining a shoulder engageable with the stud 24 on the side wall b of the frame. A spring 25 extends from the anchor 26 on the side wall b to the rod 22 to hold the rod in position engaging the shoulder 23 with the stud 24.

It can now be seen, that by releasing the rod 20 and pulling toward the right in Figure 1, the latch plate 17 is thrown from a centralized position with respect to the shaft 13 to an elevated position as shown in Figure 1, thus releasing the stake 6 and as the stake 6 is subjected to the force of a cargo the stake will swing outwardly as suggested in Figure 1 and in this movement the pin 10 will ride out of the notches 9.

Thus the stake of a vehicle can be released without danger to the attendant.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A stake and control assembly comprising a frame-like structure, a stake pivotally secured at its lower end within the frame, a latch plate engageable with the lower portion of the stake and a manual control for the said latch plate, a shaft disposed through the frame, arms extending from the shaft, a countershaft carried by the arms and on which the said latch plate is rockable, said manual means being adapted to rotate the said first-mentioned shaft to release the latch plate from the stake.

2. A stake and control assembly therefor comprising a frame-like structure, a stake pivotally secured at its lower end within the frame, a latch plate engageable with the lower portion of the stake and a manual control for the said latch plate, a shaft disposed through the frame, arms extending from the shaft, a countershaft carried by the arms and on which the said latch plate is rockable, said manual means being adapted to rotate the first-mentioned shaft to release the latch plate from the stake, said frame having an outstanding projection, said manual means comprising an arm on the outer end of the first-mentioned shaft, a rod extending from the last-mentioned arm and pivotally secured thereto, a handle at the free end of the rod and an offset in the rod for normal engagement with the projection to prevent accidental displacement of the stake.

HAROLD C. SWERTFEGER.